United States Patent [19]

Artail et al.

[11] Patent Number: 5,592,372
[45] Date of Patent: Jan. 7, 1997

[54] SEALED HOUSING EVAPORATIVE DETERMINATION TESTING APPARATUS AND METHOD

[75] Inventors: Hassan A. Artail, Dearborn; Dennis M. Blumke, Washington Township, both of Mich.

[73] Assignee: Chrysler Corporation, Auburn Hills, Mich.

[21] Appl. No.: 383,144

[22] Filed: Feb. 3, 1995

[51] Int. Cl.$^6$ .......................... G05B 21/02; G01M 15/00
[52] U.S. Cl. ...................... 364/178; 364/179; 73/23.31; 73/117.1
[58] Field of Search .................................. 364/178, 179; 73/23.2, 23.25, 23.31, 116, 117.1

[56] References Cited

U.S. PATENT DOCUMENTS

| | | | |
|---|---|---|---|
| 4,928,015 | 5/1990 | Butler et al. | 250/343 |
| 5,167,146 | 12/1992 | Hostetter | 73/117.1 |
| 5,218,857 | 6/1993 | Decker et al. | 73/23.31 |
| 5,275,144 | 1/1994 | Gross | 123/520 |
| 5,369,976 | 12/1994 | Ratton | 73/23.2 |
| 5,388,453 | 2/1995 | Ratton et al. | 73/117.1 |
| 5,419,178 | 5/1995 | Decker et al. | 73/23.31 |

OTHER PUBLICATIONS

Affidavit of Hassan A. Artail dated May 2, 1995, two pages.
Chrysler Corporation Highland Park Test Laboratory, "VT Diurnal Test", Feb. 25, 1992, 7 pages (Exhibit A).
Chrysler Corporation, Highland Park Test Laboratory, "VT Diurnal Test", Mar. 4, 1992, 7 pages (Exhibit B).
Chrysler Corporation, Highland Park Test Laboratory, "Propane Injection & Retention," Jan. 2, 1992, 4 pages (Exhibit C).

Primary Examiner—Paul P. Gordon
Attorney, Agent, or Firm—Mark P. Calcaterra

[57] ABSTRACT

A computer controlled sealed housing evaporative determination (SHED) testing apparatus and method are provided for testing evaporative emissions for a motor vehicle. The SHED testing apparatus includes a substantially air-type testing structure for enclosing a subject motor vehicle and containing a quantity of ambient air. The ambient air is sampled at the beginning and end of a given test to measure the amount of hydrocarbons present therein. The apparatus undergoes a predefined testing procedure in which temperature of the air within the sealed testing structure is controlled in a predefined manner. To account for pressure changes due to the changing temperature, a portion of the ambient air contained within the testing structure may be evacuated from or introduced into the testing structure so as to maintain a substantially constant pressure differential of zero. The evacuated or introduced air is sampled and tested to determine the amount of hydrocarbons added into and evacuated from the testing structure. The total added and evacuated hydrocarbons are used with the beginning and end test measurements to determine a net evaporative emissions.

16 Claims, 4 Drawing Sheets

SEALED HOUSING EVAPORATIVE DETERMINATION TESTING APPARATUS AND METHOD

BACKGROUND OF THE INVENTION

1. Technical Field

The present invention relates generally to motor vehicle emissions testing and, more particularly, to a computer controlled sealed housing evaporative determination (SHED) testing apparatus and method for automatically testing motor vehicle evaporative emissions under a number of testing schedules.

2. Discussion

In recent years, motor vehicle manufacturers have greatly reduced the levels of hydrocarbons, e.g., carbon monoxide, carbon dioxide, etc., and other gasoline and diesel powered motor vehicle emissions in response to increased governmental regulations aimed at preserving and protecting the environment. In addition to the commonly known tailpipe emissions, i.e., the exhaust gases produced during the combustion process of the motor vehicle engine, there are also evaporative emissions. That is, a motor vehicle produces emissions while simply sitting parked due to evaporation of oil, fuel and other fluids which are common to motor vehicles.

In this regard, modern motor vehicles incorporate sealed fuel and lubrication systems which often include charcoal canisters and the like for collecting vapors produced as a result of evaporation of these hydrocarbon based fluids. The conventional sealed fuel and lubrication systems typically retain the vapors for later burning in the vehicle engine when the vehicle is running. Still, not all of the vapors can be collected, and those which are not collected are generally classified as evaporative emissions.

Governmental regulations such as those promulgated by the Federal Environmental Protection Agency (EPA) and the California Air Resource Board (CARB) often establish strict limitations on the amount of emissions, both exhaust gas and evaporative, that a motor vehicle may produce. Modern day regulations also require that a motor vehicle manufacturer test and certify that the vehicles manufactured and sold conform to these regulations. The allowable amounts of emissions are often measured as parts per million (ppm) of a total sample of air collected. Thus, vehicle manufacturers require sophisticated and highly accurate testing equipment for performing the necessary emissions tests. Testing for evaporative emissions is typically conducted according to what is commonly known as a sealed housing evaporative determination (SHED) test.

Early evaporative emissions regulations mandating SHED tests generally only required that a vehicle be operated for a given period of time and then the amount of evaporative emissions produced during a set time period thereafter (usually one hour) be measured. In the past, this type of SHED test was simply conducted by operating the vehicle on a test track or chassis dynamometer and then placing the vehicle in a sealed structure for a required time period. The amount of emissions produced was simply the difference in hydrocarbon levels measured at the beginning of the test and at the end of the test.

Modern regulations recognize that a motor vehicle produces emissions as a result of evaporation of fluids due to heating and cooling conditions of the surrounding environment. Therefore, such modern regulations require measuring evaporative emissions produced by a vehicle over the course of several days and in response to changing temperature conditions. That is, the vehicle must be cycled through a number of temperature changes over the course of several days so as to simulate what the vehicle might experience, due to heating by the sun during the day and cooling during the evening and night, while parked for several days. Such testing requirements are known as variable temperature SHED tests and pose a number of difficulties.

One of the difficulties with performing variable temperature SHED tests in accordance with modern regulations lies in controlling the temperature and pressure within the sealed SHED testing structure. Changing the SHED temperature can be accomplished by providing a heating unit and a cooling unit with controls for maintaining the SHED structure at the appropriate temperature. However, changes in the air temperature cause corresponding changes in the volume and hence changes in the pressure of the air within the SHED structure. Air pressure changes within the SHED structure can cause a number of adverse affects on the results provided by the SHED test. For example, changes in air pressure affect the performance of the vehicle emission control systems. Also, leaks often remain in the SHED test housing in spite of the fact that every effort is made to completely seal the SHED structure housing. Pressure differences between the interior of the SHED structure housing and the outside environment encourage a migration of air either into or out of the SHED structure through any leaks, thus affecting the accuracy of the test results. Therefore, it is desirable to control the pressure changes in order to maintain a pressure difference between the interior of the SHED structure and the surrounding outside environment as near zero as possible.

Several testing systems have been proposed to accomplish the desired pressure control. Recognizing that the pressure change is a response to an attempt to change the volume of the air within the SHED structure as a result of changing air temperature, one conventional system incorporates a moving roof on the SHED structure housing. The moving roof is in the form of a mechanical operated bellows which causes the roof to rise and fall in accordance with changes in temperature, and therefore volume, of the air within the SHED structure. In this manner, the volume of the SHED structure is made to correspond to the volume of air within the structure for any given temperature. The volume of the SHED structure is therefore determined by the position of the roof, and a calculation of the evaporative emissions can be made based upon the known volume of air. The moving roof approach, however, proves to be prohibitively expensive and difficult to maintain as it requires complex mechanical and control elements.

Similarly, another conventional system incorporates a bladder bag in place of the moving roof. As pressure within the SHED structure housing changes, air is pumped into or released from the bladder bag. Like the movable roof approach, the calculation of the evaporative emissions can be made based upon the known volume of air including the air contained in the bladder bag. This system, however, tends to interfere with the uniform mixing of the air within the SHED structure which may adversely affect the test results.

It is therefore one object of the present invention to provide for an apparatus and method for conducting SHED tests which provides accuracy in accordance with required governmental regulations.

Another object of the present invention is to provide a SHED testing apparatus and method which is operable to perform extended duration variable temperature SHED tests automatically and without the need for operator intervention during the test.

Yet, a further object of the present invention is to provide for an enhanced method for carrying out the SHED testing operation so as to accurately measure evaporative emissions of a motor vehicle in a fixed structure housing over a series of temperature changes so as to maintain a substantially constant pressure differential of zero and without the need for a mechanically expandable air storage compartment.

SUMMARY OF THE INVENTION

In order to achieve the foregoing objectives, the present invention provides a computer controlled sealed housing evaporative determination (SHED) testing apparatus and method for testing motor vehicle evaporative emissions. The SHED testing apparatus and method account for changing air pressure within the SHED structure in response to changing air temperature and measures the hydrocarbon concentration of air as emitted from a vehicle under test. The system includes a SHED structure housing generally having a fixed volume of ambient air and a computer control for running the SHED structure apparatus through a series of predetermined testing conditions. An air flow element is included for allowing air to flow into or out of the SHED structure in response to a pressure differential. According to a preferred embodiment, the air flow element is a laminar flow element. Inhale air flowing into and exhale air flowing out of the SHED structure is sampled and the amount of hydrocarbons included therein are measured and used in the determination of the total evaporative emissions.

BRIEF DESCRIPTION OF THE DRAWINGS

Other objects and advantages of the present invention will become apparent to those skilled in the art upon reading the following detailed description and upon reference to the drawings in which:

FIG. 1 is a perspective view of a SHED testing apparatus according to a preferred embodiment of the present invention;

DETAILED DESCRIPTION OF THE PREFERRED EMBODIMENT

With reference to FIG. 1, a SHED testing apparatus 10 is shown according to the present invention for conducting sealed housing evaporative determination motor vehicle emissions tests (SHED tests). The SHED testing apparatus 10 is disclosed according to a preferred embodiment which is suitable for testing motor vehicle evaporative emissions, however, it should be understood that the broad teachings are not limited to the particular application described herein. The SHED testing apparatus 10 includes a substantially sealed rigid testing structure 12 for enclosing a motor vehicle subject to evaporative emission testing. SHED testing apparatus 10 also has an analytical cart 54 and a computer 50 for providing computer control of heating and cooling elements, air filling and evacuating systems, and sensors within the SHED testing structure 12 provide for maintaining the testing conditions within specified governmental regulations for predefined testing conditions and for gathering testing data. The computer control system 50 also provides for gathering data from various test sensors and for processing this data in order to provide test results to the test operator or testing engineer as well as for monitoring testing conditions.

The SHED testing structure 12 is a substantially sealed rectangular enclosure with side walls 14 and 16, top 18, bottom 20 and rear wall 22. The SHED structure 12 has a door 24 hingedly secured to top wall 18 and is operable for enclosing opening 26 which is defined at the forward end of SHED structure 12 by walls 14 and 16, top 18 and bottom 20. The door 24 pivots between a closed sealed position and a raised open position under action of pneumatic cylinders 28. Pneumatic cylinders 28 are suitably secured to side walls 14 and 16 and pivotably engage crossbar 30 which is secured to door 24. A seal 32 is provided around the periphery of door 24 for engaging the surface 34 at the forward end of SHED structure 12 about opening 26 so as to provide a substantially air-tight seal of door 24 to SHED structure 12.

Side walls 14 and 16 and top 18 are sufficiently rigid in construction for securing various pieces of control equipment, such as electrical enclosure 36, instrument enclosure 38, as well as securing various other plumbing and electrical conduit thereto. In addition, a plurality of windows are provided in side walls 14 and 16, as well as top 18, rear wall 22 and door 24 for allowing a test operator or engineer to observe a vehicle being tested. As will be appreciated, the SHED structure 12 is constructed so that care is taken to seal, in a substantial air-tight manner, the inner faces of walls 14, 16 and 22, with each other and with top 18 and bottom 20 as well as to seal windows 40 to SHED structure 12.

The SHED testing apparatus 10 and associated elements are operatively controlled via the computer 50 which is shown as a stand-alone computer 50. Computer 50, in a preferred embodiment, is an IBM personal computer (PC) compatible unit which preferably includes an 80386 microprocessor. However, other microprocessor based computers may be employed, which preferably have processing capability of the 80386 or better. The preferred operating system for computer 50 is Microsoft® Windows Version 3.0 or higher. Computer 50 interfaces with the electrical enclosure 36 of the SHED structure 12 via an RS 422 serial communication link 52. Computer 50 also includes a monitor 56 for displaying desired test results and current testing parameters such as current temperature, time of testing, evaporative emissions thus far measured, etc. In addition, a key board 58 is provided for enabling an operator to interface with and enter data or programming information into computer 50.

The analytical cart 54 of the SHED testing apparatus 10, according to a preferred embodiment, is shown as a stand-alone instrumentation rack structure for holding various pieces of test and instrumentation interface equipment associated with the SHED testing apparatus 10. The analytical cart 54 includes a first flame ionization detector (FID #1) 45 and a second flame ionization detector (FID #2) 80. The flame ionization detectors 45 and 80 measure and analyze the amount of hydrocarbons detected in a given sample of air.

Figure 2:
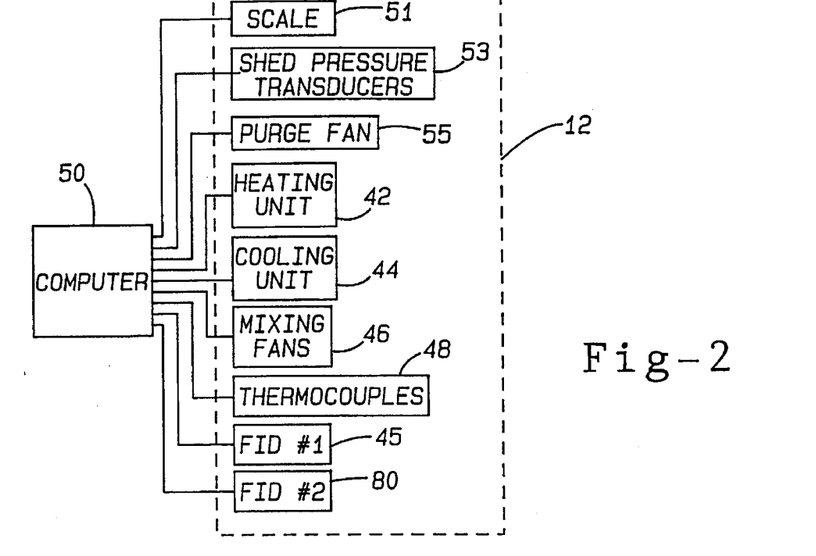
FIG. 2 is a block diagram illustrating some of the general features provided in the SHED testing apparatus.

Modern evaporative emissions tests require that a motor vehicle be subjected to temperature changes simulating changes in temperature that may occur in the environment during the course of a day. In order to provide for a changing air temperature within the SHED testing structure 12, a heating unit 42, cooling unit 44 and mixing fans 46 are installed within the SHED structure 12 as shown in FIG. 2. According to a preferred embodiment, heating unit 42 and cooling unit 44 are mounted in a duct structure (not shown) secured to the top 18 and rear wall 22 of the interior of SHED structure 12. Mixing fans 46 are arranged in relation to the duct structure to draw air from along the bottom portion of SHED structure 12 over heating unit 42 and cooling unit 44 and recirculating the now conditioned air throughout the SHED structure 12 along the top portion thereof. Ambient air thermocouples 48 are also located within the SHED structure 12 to provide current temperature measurements inside the SHED testing structure 12. It should be appreciated that the temperature control via heating unit 42, cooling unit 44 and mixing fans 46 is controlled by a controller such as computer 50 in accordance with the predefined testing schedule requirements.

During vehicle testing, with a vehicle in the SHED testing structure 12 and the door 24 in a closed position with a substantially air-tight enclosure, computer 50 operates to control both heating unit 42 and cooling unit 44 for heating and cooling the air within the SHED testing structure 12. The temperature control is activated individually or in conjunction with that of the ambient air precisely following a predefined governmentally mandated temperature profile. The thermocouples 48 are centrally positioned within the SHED structure 12 and provides a feedback signal to computer 50 for purposes of controlling the heating and cooling units 42 and 44 to achieve the desired temperature cycling.

As previously mentioned, a pair of flame ionization detectors 45 and 80 are also provided in the SHED testing apparatus 10. The flame ionization detectors and 80 are hydrocarbon measuring devices for measuring a concentration, usually in parts per million (ppm), of hydrocarbons detected in a sampled volume of air. Given the measured concentration, the mass of hydrocarbons contained in that volume of air can be calculated. The first flame ionization detector (FID #1) 45 samples a volume of air and measures the amount of hydrocarbons in the sample at least once at the beginning of the SHED test and again at the end of the SHED test. Additional sampling and testing of air can also occur during the test, generally at the request of an operator. The second flame ionization detector (FID #2) 80 is employed to sample and measure the amount of hydrocarbons present in inhale air filled into or exhale air evacuated from the SHED testing structure 12 during the testing procedure. Flame ionization detector 80 samples the inhale air from outside the SHED testing structure 12 and the exhale air from within the SHED testing structure 12. Sampling of air via flame ionization detectors 45 and 80 is generally accomplished with the addition of a sample pump (not shown) for siphoning the sampled volume of air into the corresponding detector 45 or 80. With computer 50, the mass of hydrocarbons in a given volume are calculated from the measured concentrations of hydrocarbons.

Additionally, the SHED structure 12 is equipped with pressure transducers 51, a scale 53 and a purge fan 55. The pressure transducers 51 measure the differential barometric pressure within the SHED testing structure 12. Scale 53 monitors the weight of charcoal canisters which may be removed from a given vehicle and also tested during the testing procedure. Once the testing is complete, the purge fan 55 ventilates the air from within the SHED testing structure 12 to a desired remote location before opening door 24.

Figure 3:
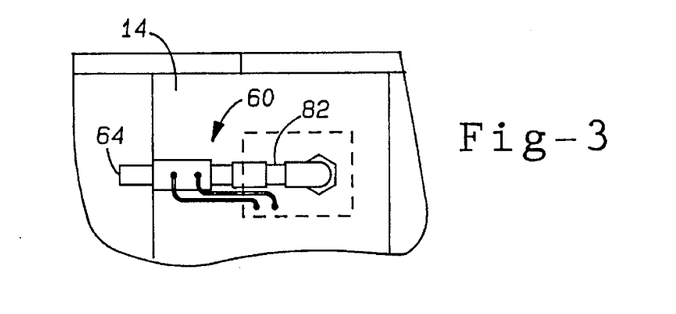
FIG. 3 is a perspective view of a cut away portion of an inner wall of the SHED testing structure illustrating a laminar flow element as employed according to a preferred embodiment of the present invention.

As previously mentioned, modern testing regulations require measuring evaporative emissions over changing temperature conditions which cause corresponding changes in the pressure of the air within the SHED testing structure 12. In order to maintain a substantially constant air pressure of zero within the SHED testing structure 12, the present invention advantageously provides for a substantially free flow of air intake and air exhaust to maintain the substantially constant zero pressure differential. To accomplish the free flow of air, the SHED testing apparatus 10 of the present invention employs the laminar flow element (LFE) 60 as shown in greater detail in FIGS. 3 and 4. Referring to FIG. 3, the laminar flow element 60 is shown mounted to wall 14 of SHED structure 12 and has an approximately two inch diameter air flow tube 82 for allowing substantially free air flow therethrough. Free air flow allows for the realization of a substantially zero pressure differential between the volume of the air within the SHED structure 12 and the outside environment.

Figure 4:
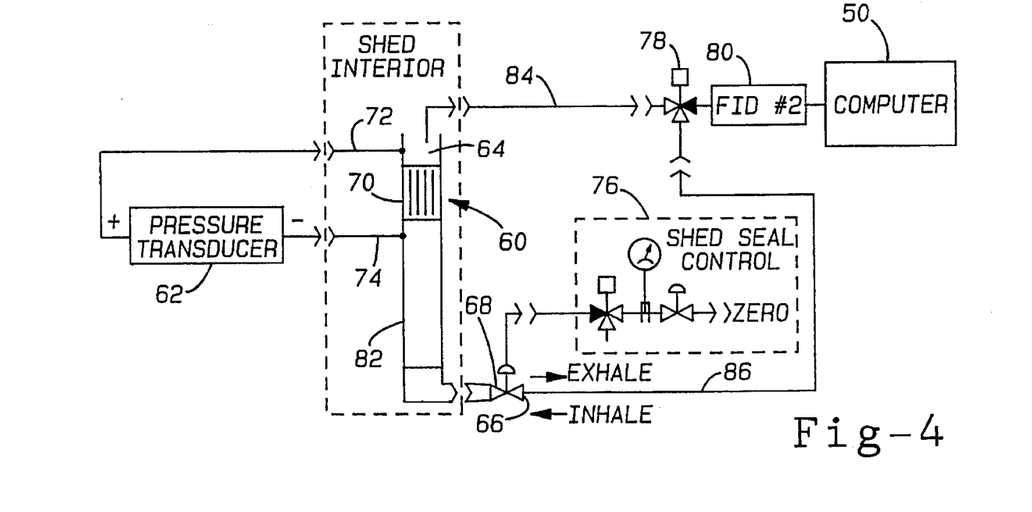
FIG. 4 is a schematic layout of the laminar flow element and sampling of air inhale/exhale therethrough as provided in the SHED testing structure of the present invention.

As shown in FIG. 4, laminar flow element 60 has a sampling region 70 extending through a portion of air flow tube 82 over which differential pressure is measured via a pressure transducer 62. In doing so, pressure transducer 62 has a pair of pressure sensing lines 72 and 74 connected on opposite sides of sampling region 70 for measuring the pressure differential between the two lines 72 and 74. Given the measured differential pressure, the dimensions and flow properties of the laminar flow element 60, and the time periods of air flow, the amount of inhale air entering or exhale air exiting the SHED structure 12 can be determined.

The laminar flow element 60 also has an outside port 66 connected to air flow tube 82 via a solenoid operated valve 68. The solenoid operated valve 68 is operated in response to SHED seal control 76 for opening and closing valve 68 in response to the detected presence of a pressure differential. The inside port 64 has air sampled therefrom via an exhale sample line 84 which is coupled to valve 78. The output of valve 78, in turn, is coupled to flame ionization detector (FID #2) 80. The flame ionization detector 80 analyzes the sampled air and measures hydrocarbon concentration in parts per million (ppm) of the ambient air within SHED structure 12. Likewise, an inhale sample line 86 samples air entering the SHED structure 12 through the outside port 66. Accordingly, detector 80 analyzes inhale air which is filled into or exhale air evacuated from SHED structure 12. As previously mentioned, inside port 64 has exhale air sampled therefrom via exhale sample line 84 so as to measure the hydrocarbons exhaled via the laminar flow element 60. Likewise, inhale sample line 86 samples the inhale air that is allowed to flow into the SHED structure 12 and the sampled inhale air is analyzed via the detector 80 to determine the hydrocarbons of the air introduced into the SHED structure 12. Accordingly, sample lines 84 and 86 allow for the concentration of hydrocarbons introduced or released from SHED structure 12 to be measured and the mass of hydrocarbons calculated and used in the determination of the overall evaporative emissions testing schedule.

Figure 5:
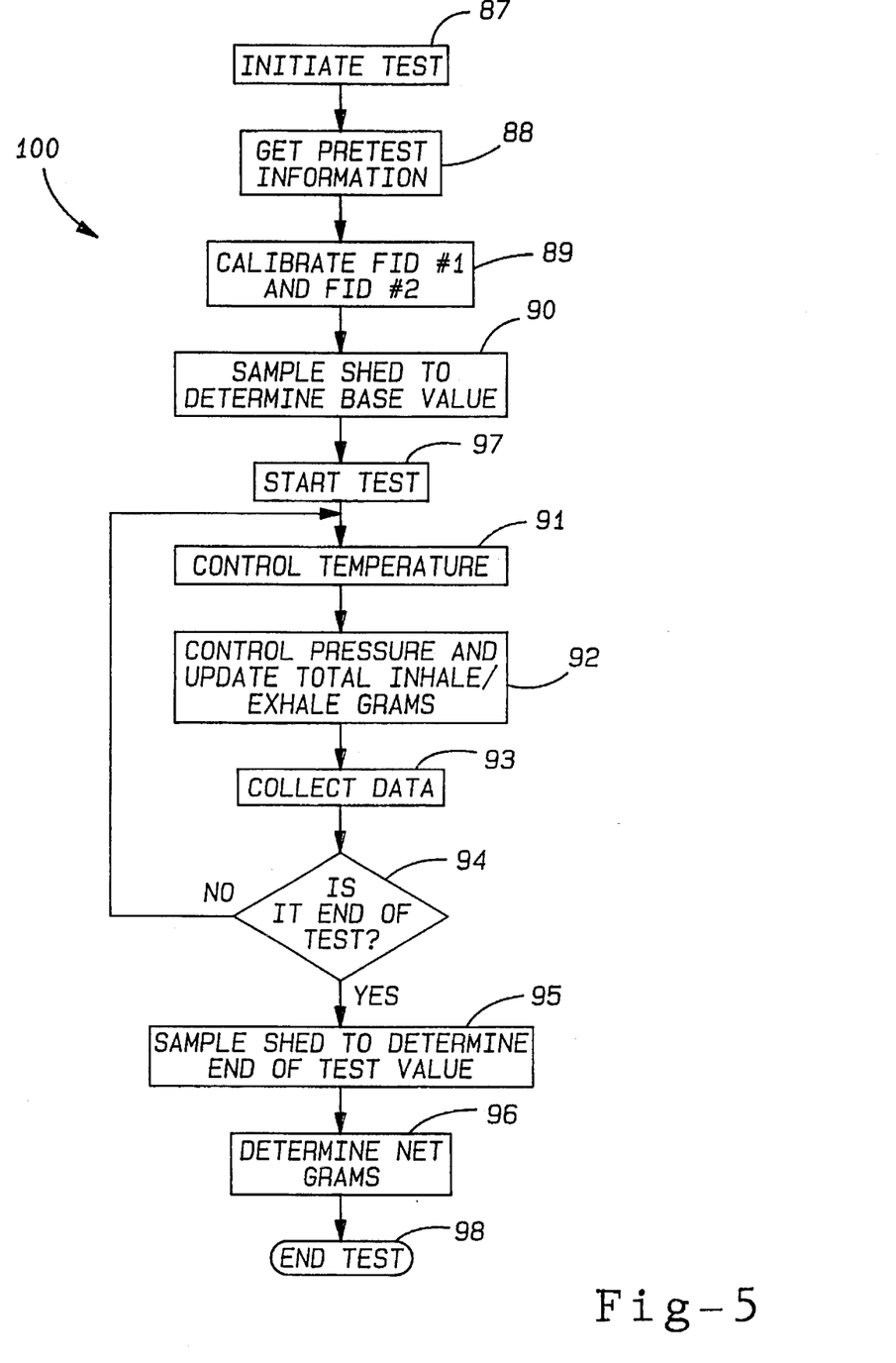
FIG. 5 is a flow diagram generally illustrating a method of performing SHED tests according to the present invention.

Turning now to FIG. 5, a testing methodology 100 of performing a SHED test according to the present invention is shown therein. With a vehicle located within the SHED testing structure 12 and the door 24 in a closed position to form a substantially air-tight enclosure, the SHED test methodology 100 may begin the evaporative emissions testing procedure by initiating a test as shown by block 88. Initially, pre-test information is gathered per step 88 and then flame ionization detectors (FID #1 and FID #2) 45 and 80 undergo a calibration step 89. The test procedure requires initially sampling the volume of ambient air within the SHED structure 12 as provided at block 90. This is preferably accomplished by sampling a volume of air in structure 12 and measuring the concentration in parts per million (ppm) of hydrocarbons from the sampled volume of the ambient air as analyzed by the flame ionization detector (FID #1) 45. Given the known density of hydrocarbons and the volume of air in the SHED structure 12, the amount of hydrocarbons (in parts per million) are used to calculate an initial mass (in grams) of hydrocarbons. The initial sampled mass thereby provides a base value that is used to determine the overall evaporative emissions for the vehicle being tested.

Once the initial sample is measured and base value calculated, the predefined SHED testing schedule is started pursuant to step 97. The SHED test methodology 100 thereafter cycles through a predefined testing procedure in which the temperature is controllably changed per step 91 in a predefined manner so as to simulate changes in temperature in the environment over a period of time. As the temperature changes start to cause changes in pressure of the air within the SHED testing structure 12, a substantially constant pressure differential is maintained per step 92. In doing so, inhale and exhale of air flows through laminar flow element 60 and is continually sampled and total inhale and exhale grams of hydrocarbons are updated as provided by step 92. To accomplish this, air which is inhaled into the testing structure 12, generally in response to a temperature decrease, is measured to provide for inhale grams of hydrocarbons introduced into the SHED testing structure 12. Likewise, exhale air which is output from SHED testing structure 12, generally in response to a temperature increase, is analyzed to measure exhale grams of hydrocarbons. Total inhale grams and total exhale grams are stored and updated throughout the test. The method of updating the total inhale and exhale grams of hydrocarbons will be discussed hereinafter in connection with FIG. 6.

After the SHED testing structure 12 is cycled through the predefined testing procedures of step 92, additional data is collected in step 93. Next, the methodology checks to see if the test is ended and, if not, returns to step 91. If the test is ended, the SHED structure 12 is once again sampled as provided by step 95. The final sampling is measured to provide an end of test measurement of the concentration of hydrocarbons in parts per million which is used to calculate a final end of test mass. The net grams of evaporative emissions of hydrocarbons is then determined by adding the difference between the end of test grams and starting base value of grams to the difference between the total exhale grams and the total inhale grams as shown in step 96. Once the total net grams are determined, the test methodology 100 is ended as indicated by block 98.

Figure 6:
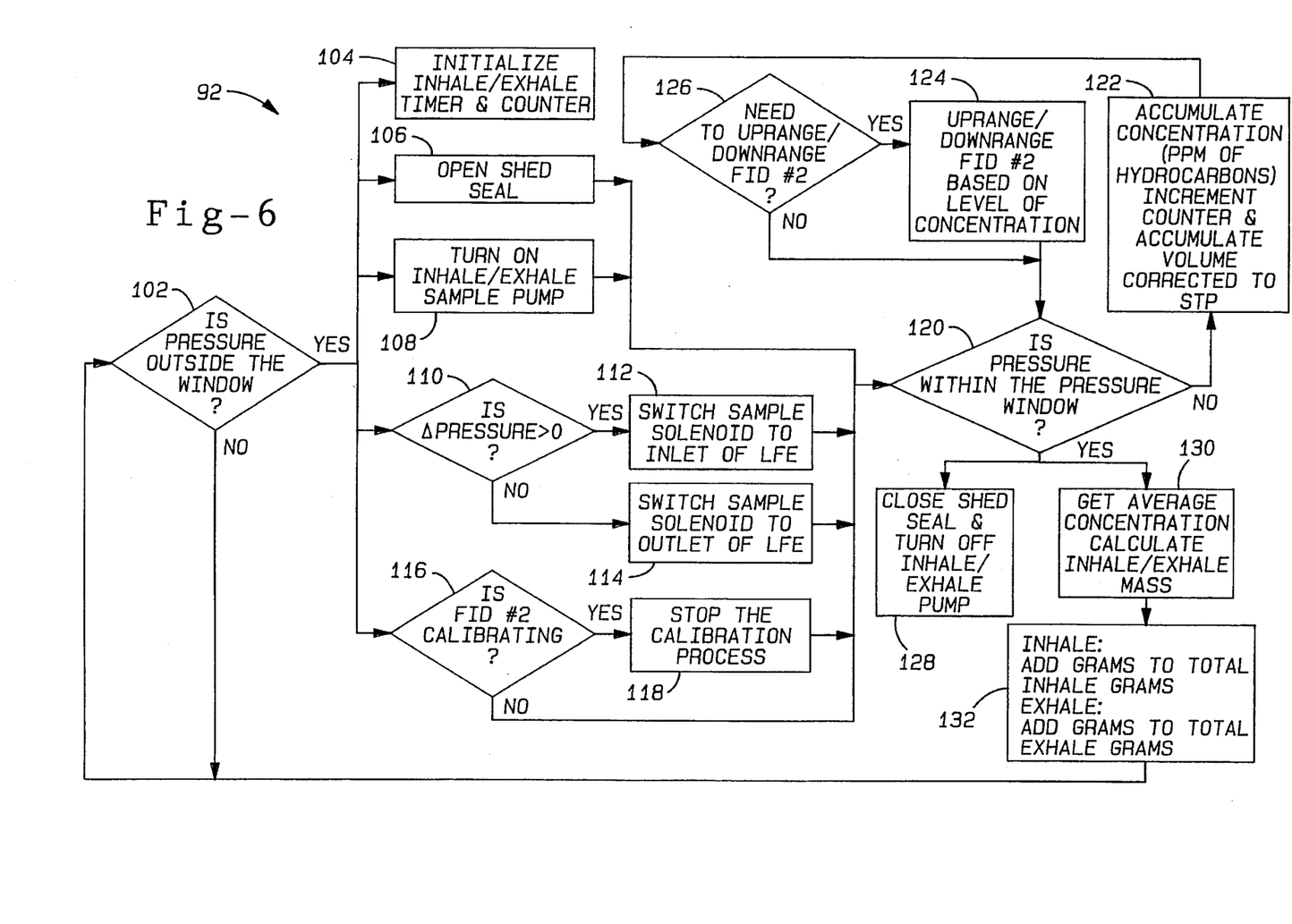
FIG. 6 is a detailed flow diagram illustrating the step of controlling pressure and updating measured evaporative emissions according to the SHED testing method of FIG. 5.

With particular reference to FIG. 6, the methodical step 92 of controlling pressure and updating total inhale and exhale grams of hydrocarbons is illustrated in greater detail therein. The air pressure within the SHED testing structure 12 is monitored and compared to the air pressure of the outside environment to determine any difference in air pressure therebetween. Step 102 determines if the air pressure differential is within an acceptable predefined window indicative of an acceptable inside air pressure. If the change in air pressure is within the predefined window, there will be no occurrence of inhale of air into or exhale of air out of the SHED structure 12, and hence the total inhale and exhale grams of hydrocarbons need not be updated. Once the air pressure differential between the inside and outside of SHED structure 12 exceeds the predefined window, a series of steps are initiated. This includes, initialization of an inhale/exhale timer and counter as indicated by step 104. As provided by step 106, the SHED seal is opened via SHED seal control 76 and valve 68 to allow for the passage of air flow through the laminar flow element 60. Also, according to step 108, an inhale/exhale sample pump is turned on to aid in pumping sampled inhale and exhale air to the flame ionization detector 80.

With the air pressure differential outside the predefined window, the air pressure differential is compared with zero to determine whether the air pressure within the SHED testing structure 12 is greater than or less than the outside environmental air pressure as shown by step 110. If the air pressure within SHED testing structure 12 is greater than the outside environmental air pressure, the sample solenoid 78 is switched to sample air from the inside port 64 of the laminar flow element 60 as provided by block 112. Otherwise, with the air pressure within SHED structure 12 less than the outside environmental pressure, the sample solenoid 78 is switched to sample air from the outside port 86 of the laminar flow element 60 as provided by block 114.

Additionally, the flame ionization detector (FID #2) 80 undergoes normal calibration procedures as are necessary. A calibration check for flame ionization detector 80 (FID #2) is provided in step 116. If the calibration of flame ionization detector 80 is in progress, the calibration process is stopped at this juncture during the updating of inhale and exhale grams of hydrocarbons with the pressure differential outside the predefined window.

Once again, the pressure differential is checked to see if the air pressure differential is within the predefined window as provided by step 120. If the pressure differential is not within the predefined pressure window, the methodology according to step 122 provides for an accumulation of the concentration of hydrocarbons, increments a counter and accumulates volume as corrected to standard temperature pressure (STP). Additionally, a determination for the need to uprange or downrange the flame ionization detector (FID #2) 80 is checked according to step 126. If an uprange or downrange is required, the methodology according to step 124 provides either an increase or decrease in the range of the flame ionization detector 80 based on a level of concentration detected therewith. Following step 124, the air pressure differential is again checked with the predefined pressure window via block 120.

Once the air pressure differential is within the predefined pressure window, the SHED seal is closed and the inhale/exhale sample pump is turned off as shown in step 128. In addition, an average concentration of hydrocarbons in parts per million is measured and the inhale mass (in grams) and exhale mass (in grams) of hydrocarbons are calculated according to step 130. Thereafter, for the occurrence of an air inhale, the calculated inhale grams are added to the total accumulated inhale grams as provided by block 132 to achieve an updated total inhale grams. Likewise, for the occurrence of an air exhale, the calculated exhale grams are added to the total accumulated exhale grams to achieve an updated total exhale grams. The total inhale and exhale mass in grams of hydrocarbons are therefore continually updated in response to air being added to or removed from the SHED structure 12 during the testing procedure. The total updated inhale and exhale grams, as well as the initial base value mass and end of test mass, are used to determine a total mass of evaporative emissions as illustrated by the following equation:

Evap. emissions=(End grams–Base value grams)+(Total exhale grams–Total inhale grams)

It should be appreciated that the present invention allows for accurate testing of evaporative emissions throughout a substantially constant pressure, despite temperature variations. This is accomplished with substantially free flow of air into and out of the SHED testing structure 12 and with accurate measurement of hydrocarbons associated with the inhale and exhale air.

While a specific embodiment of the invention has been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the present invention as described in the following claims.

What is claimed is:

1. An apparatus operable for testing motor vehicle evaporative emissions comprising:

a substantially air-tight testing structure operable for enclosing a subject motor vehicle, the testing structure containing a quantity of ambient air;

environmental control means for controlling temperature of the ambient air within the testing structure;

sampling means for withdrawing a portion of the ambient air from within the testing structure;

means for testing the sampled portion of the ambient air;

means for evacuating a portion of the ambient air contained within the testing structure and for filling a portion of air into the testing structure such that the pressure of the ambient air within the structure remains substantially constant;

means for testing the evacuated or filled air; and means for determining the amount of evaporated emissions.

2. The apparatus as defined in claim 1 wherein said means for evacuating and filling a portion of air comprises an air flow element forming an air passage between an interior of the testing structure and an outside environment, said air flow element allowing substantially free air flow therethrough.

3. The apparatus as defined in claim 2 wherein said air flow element comprises a laminar flow element.

4. The apparatus as defined in claim 3 wherein said laminar flow element is coupled to a pressure transducer for measuring a pressure differential across a sampling region of the air passage of said laminar flow element.

5. The apparatus as defined in claim 2 further comprising a valve coupled to said air flow element for either allowing or preventing air flow therethrough.

6. The apparatus as defined in claim 5 further comprising means for monitoring a pressure differential between the inside of the testing structure and an outside environment, wherein said valve opens said monitored pressure differential.

7. The apparatus as defined in claim 1 wherein said means for testing air comprises a flame ionization detector.

8. An apparatus operable for testing motor vehicle evaporative emissions comprising:

a substantially air-tight testing structure operable for enclosing a subject motor vehicle, the testing structure containing a quantity of ambient air;

environmental control means for controlling temperature of the ambient air within the testing structure so as to cycle the temperature through a variable temperature testing schedule;

sampling means for withdrawing a portion of the ambient air from within the testing structure;

a first hydrocarbon detector for testing the sampled portion of the ambient air both at a beginning and an end of a given test;

an air flow element having an air passage for evacuating a portion of the ambient air contained within the testing structure and for filling a portion of air into the testing structure such that the pressure of the ambient air within the structure remains substantially constant;

a second hydrocarbon detector for testing the evacuated or filled air to determine evaporative emissions added to and removed from the testing structure; and means for determining a net amount of evaporated emissions exhibited by a vehicle as a function of the beginning and end test and measured emissions added or removed during the test.

9. The apparatus as defined in claim 8 wherein said air flow element comprises a laminar flow element providing an air passage between an inside of the testing structure and an outside environment, said air passage allowing substantially free air flow therethrough.

10. The apparatus as defined in claim 9 wherein said laminar flow element is coupled to a pressure transducer for measuring a pressure differential across a sampling region of the air passage of said laminar flow element.

11. The apparatus as defined in claim 8 further comprising a valve coupled to the air flow element and means for monitoring a pressure differential between the inside of the testing structure and an outside environment, wherein said valve opens and closes in response to said monitored pressure differential.

12. The apparatus as defined in claim 8 wherein said first and second hydrocarbons detectors each comprise a flame ionization detector.

13. A method of testing evaporative emissions of a motor vehicle comprising:

enclosing a subject motor vehicle in a substantially air-tight testing structure which has a substantially fixed volume and quantity of ambient air;

sampling a portion of the ambient air from within the testing structure;

controlling the temperature of the ambient air within the testing structure over a predefined testing cycle;

evacuating a portion of the ambient air contained within the testing structure and filling a portion of air into the testing structure so that pressure of the ambient air within the testing structure remains substantially constant over a varying temperature range;

determining the amount of hydrocarbons introduced into the ambient air and an amount of hydrocarbons released from the ambient air of the testing structure; and determining an amount of net evaporative emissions.

14. The method as defined in claim 13 further comprising the steps of:

determining an initial amount of hydrocarbons present in the ambient air of the testing structure at the beginning of a test; and determining a final amount of hydrocarbons present in the ambient air of the testing structure at the end of the test.

15. The method as defined in claim 14 wherein said step of determining an amount of net evaporative emissions comprises subtracting the initial amount of hydrocarbons from the final amount of hydrocarbons and subtracting total hydrocarbons added to the testing structure during the test and adding total hydrocarbons evacuated from the testing structure during the test.

16. The method as defined in claim 13 wherein said step of evacuating and filling a portion of air comprises allowing a substantially free flow of air into or out of the testing structure in response to a pressure differential between the inside of a testing structure and an outside environment.

* * * * *